(12) United States Patent
DeGroff

(10) Patent No.: US 6,612,521 B1
(45) Date of Patent: Sep. 2, 2003

(54) SAFETY PITOT TUBE COVER

(76) Inventor: Steve DeGroff, 150 Forest Dr., Berne, IN (US) 46711

( * ) Notice: Subject to any disclaimer, the term of this patent is extended or adjusted under 35 U.S.C. 154(b) by 0 days.

(21) Appl. No.: 10/253,301

(22) Filed: Sep. 24, 2002

(51) Int. Cl.[7] .............................................. B64D 45/00
(52) U.S. Cl. ...................... 244/1 R; 244/121; 244/3.16
(58) Field of Search ................. 244/1 R, 121, 244/316; 73/861.65, 861.66, 182; 150/154, 166

(56) References Cited

U.S. PATENT DOCUMENTS

| | | | |
|---|---|---|---|
| 3,106,374 A | 10/1963 | Olson et al. ................ | 244/121 |
| 3,266,755 A | 8/1966 | West, Jr. ..................... | 244/121 |
| 3,637,166 A * | 1/1972 | Nicholson et al. | |
| 4,423,660 A | 1/1984 | Ouellette ..................... | 89/1.51 |
| 5,026,001 A | 6/1991 | Wright et al. ................ | 244/1 R |
| 5,127,265 A | 7/1992 | Williamson ................... | 73/182 |
| 5,433,635 A * | 7/1995 | Kobayashi | |
| 5,660,357 A | 8/1997 | Grossman .................... | 244/121 |
| 5,744,748 A | 4/1998 | Mikhail ...................... | 102/523 |
| RE35,831 E | 6/1998 | Wright et al. ............... | 244/1 R |
| 5,938,147 A | 8/1999 | DeGroff ...................... | 244/1 R |

* cited by examiner

Primary Examiner—Tien Dinh
(74) Attorney, Agent, or Firm—Robert G. Lev

(57) ABSTRACT

A pitot tube cover that is arranged with a cavity to encompass the pitot tube, a central vertical split separates the cover and allows it to separate from the pitot tube. A wind surfaces channel the wind into the split, and a spring holds the cover onto the pitot tube. Once the aircraft reaches a predetermined speed, the wind is forced by the front angled wind surfaces into the split, thus separating the cover from the pitot tube and exposing the tube's opening to the oncoming wind pressure.

9 Claims, 3 Drawing Sheets

SAFETY PITOT TUBE COVER

FIELD OF THE INVENTION

The present invention is directed to pitot tube covers, and in particular is directed to a pitot tube cover which is removed automatically by sufficient air speed.

BACKGROUND ART

Present-day aircraft carry one or more pivot tubes. Normally, pitot tubes have forward projecting openings that when exposed to air pressure in movement, send air pressure information to an airspeed indicator or other aircraft instrument. When the aircraft is on the ground, it is important that external materials such as moisture, dust, and insects not contaminate the pitot tube.

In order to prevent such contamination, the pitot tube is covered by a pitot tube cover when an aircraft is grounded. This cover must usually be removed prior to an aircraft's takeoff.

Conventional pitot tube covers can be expensive and complicated. Furthermore, there have been recorded incidents of pitot tube covers not being removed prior to flight, thus contributing to dangerous situations. The background art has addressed this problem to some extent.

U.S. Pat. No. 3,106,374 to Olson et al. discloses an automatically releasable static discharge guard. This guard has a body made of plastic rubber neoprene. It includes a boar for receiving the outer end of a static discharge tube. The other end of the guard is provided with a frusto-conical section having an open end. In the event that the guard is left on the static discharge tube during flight, the air stream entering the opening causes the guard to be detached from the static discharge tube.

U.S. Pat. No. 5,026,001 to Wright et al. discloses a pitot static tube cover made out of a rigid material skeleton covered with a ceramic braid. A cross-bar with holes is provided so that the pitot static tube cover may be mounted or dismounted by pole from the ground.

U.S. Pat. No. 5,127,265 to Williamson et al. discloses a flame and heat-resistant cover for an airplane pitot tube. The cover includes a woven tube of fire-resistant fibers. The front of the tube is gathered and is sown with a fire-resistant non-abrasive thread. The cover is forced off of the tube when sufficient air speed is achieved to cause the cover to rotate off its position.

U.S. Pat. No. 2,786,353 discloses a pitot tube cover for selected placement over a pitot tube. The cover includes a shell having an enclosure and a funnel-shaped flange at the forward end of the shell. The cover is made of a plastic or metal, and is provided with a thin section or weakened ridges which extend along the entire length of the cover. In the event that the cover is left on the pitot tube, the air stream entering the flange causes the shell to break apart at the ridges and therefore fall off the pitot tube.

U.S. Pat. No. 2,532,316 discloses an automatically releasable cover for protecting a pitot tube. The releasable cover is made up of two L-shaped metal strips and fabricated of spring steel, which is stitched into the fabric. Two opposite latching studs or detents are also provided so that when the fabric is folded over the pitot tube, the spring steel metal strips are retained together. A deflector extends below the cover and cooperates therewith in a manner whereby the air pressure against the deflector causes the cover to pivot. This also causes the latching studs to detach from one another, thereby causing the cover to fall off the pitot tube.

U.S. Pat. No. 2,488,310 discloses an automatic shutter mechanism for a pitot tube. The mechanism includes a shutter attached to a shutter shaft, which extends through a clam bearing and bears the plunger spring. A wind pressure plane is attached to the shaft. In operation, air which is forced against the pressure plane forces the pressure plane along with the shutter shaft and shutter rearwardly against the spring, thereby uncovering the opening of the pitot tube.

U.S. Pat. No. 5,938,147 to DeGroff discloses a pitot tube cover arranged with a slot to encompass the pitot tube, and a wooden surface that is perpendicular to the direction of travel of the vehicle upon which the pitot tube is mounted. Once the vehicle reached a predetermined speed, sufficient force is applied against the wind surface, causing the cover to rotate about a pivot area, thereby freeing itself from the pitot tube and allowing the pitot tube to operate normally.

While some of the conventional art has provided pitot tube covers that automatically are removed from the pitot tube once a certain airspeed is achieved, the conventional designs are not suitable for all shapes and sizes of pitot tube. Certain configurations of pitot tube cannot be handled by the aforementioned examples of conventional art. As always, such cover must be light, simple and inexpensive so that its loss in air does not constitute an unreasonable expense. Further, the cover must be of a sufficiently light material that ejection of the cover does not cause air frame damage should the cover hit the plane.

SUMMARY OF THE INVENTION

Consequently, it is a primary object of the present invention to provide a pitot tube cover that automatically exposes the pitot tube opening when the aircraft is in flight.

It is a further object of the present invention to provide a pitot tube cover that uses the air pressure to separate the pitot tube cover form the pitot tube.

It is another object of the present invention to provide a pitot tube cover that prevents moisture, dust, insects, and other external contaminants from entering the pitot tube opening.

It is an additional object of the present invention to provide a pitot tube cover that can be easily mounted on the pitot tube.

It is still a further object of the present invention to provide a pitot tube cover that is easily cleaned.

It is yet another object of the present invention to provide a pitot tube cover cover that is lightweight so that it does not cause any damage when dropped from any aircraft at high altitudes.

It is again a further object of the present invention to provide a pitot tube cover with a simple, inexpensive design.

It is still an additional object of the present invention to provide a pitot tube cover capable of handling a wide variety of pitot tube shapes and sizes.

It is yet a further object of the present invention to provide a pitot tube cover that is adjustable so that separation air speeds can be selected.

These and other objects and goals of the present invention are achieved by a cover for a pitot tube mounted on an aircraft. The cover has a center split along the entire vertical axis and extends horizontally from the front to the rear of the cover in the center. It also has a molded cavity at the split for encompassing the pitot tube and also a tensioning strap to hold the cover onto the pitot tube. There is also a sloped wind surface on the front of the cover, channeling the wind into the split thereby separating the cover from the pitot tube and allowing the tube to be exposed.

DETAILED DESCRIPTION OF THE PREFERRED EMBODIMENTS

The pitot tube cover is preferably made of low density polyethylene foam or cross-linked polyethylene foam and can be made either by a molding process or by cutting and shaping from a larger block of polyethylene foam. However, other lightweight or low density materials can be used within the context of the present invention.

Figure 2:
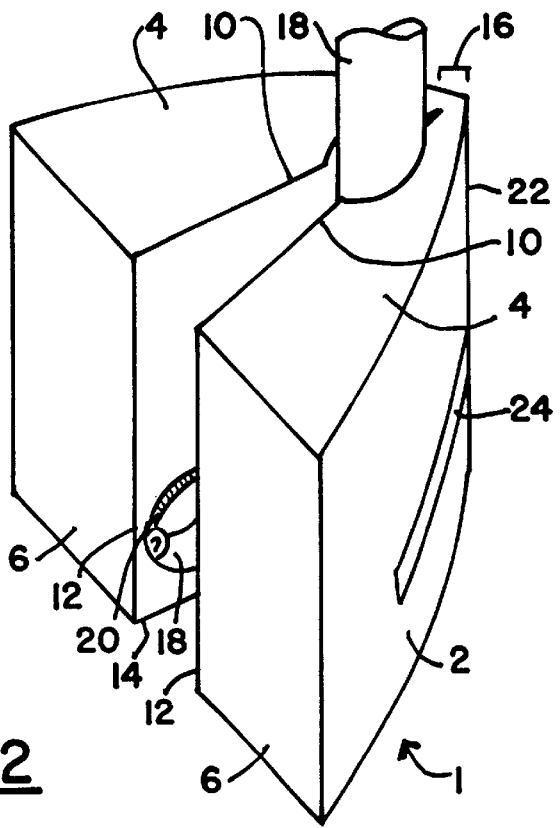
FIG. 2 is a front perspective view of the pitot tube cover of the present invention opened partially with a pitot tube inside.
Figure 3:
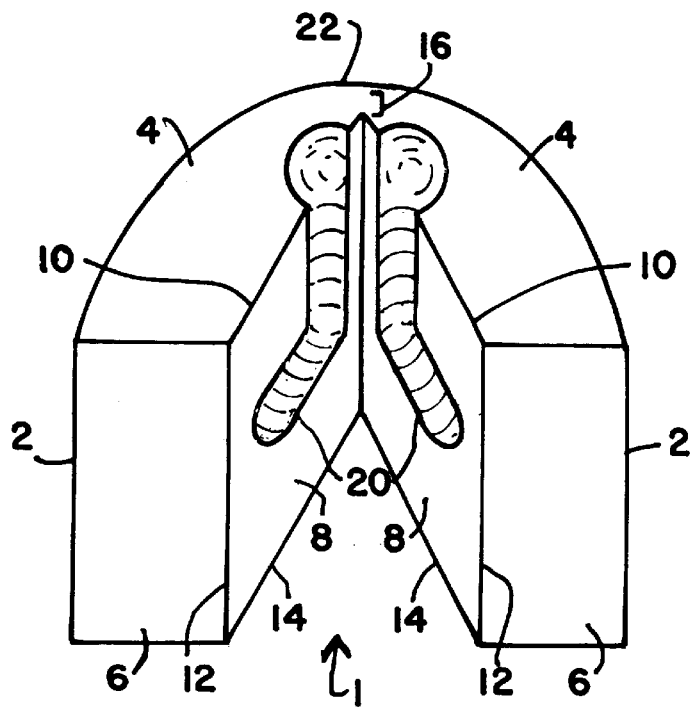
FIG. 3 is a rear perspective view of the pitot tube cover of the present invention in the opened position.
Figure 4:
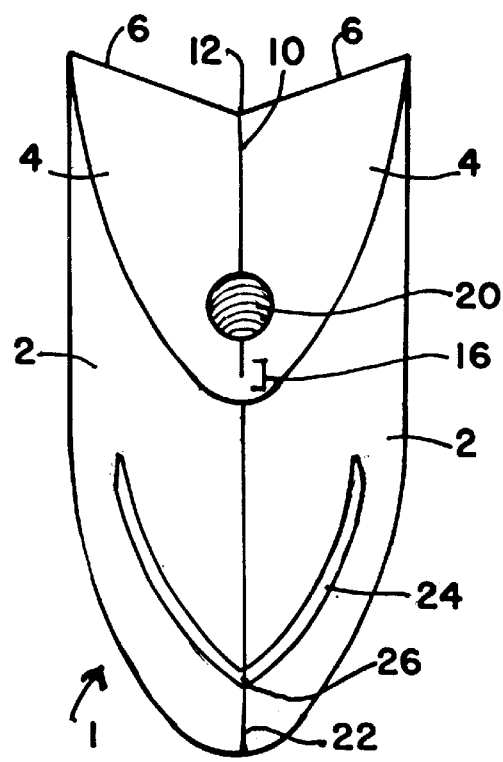
FIG. 4 is a front perspective view of the pitot tube cover of the present invention in the closed position.
Figure 5:
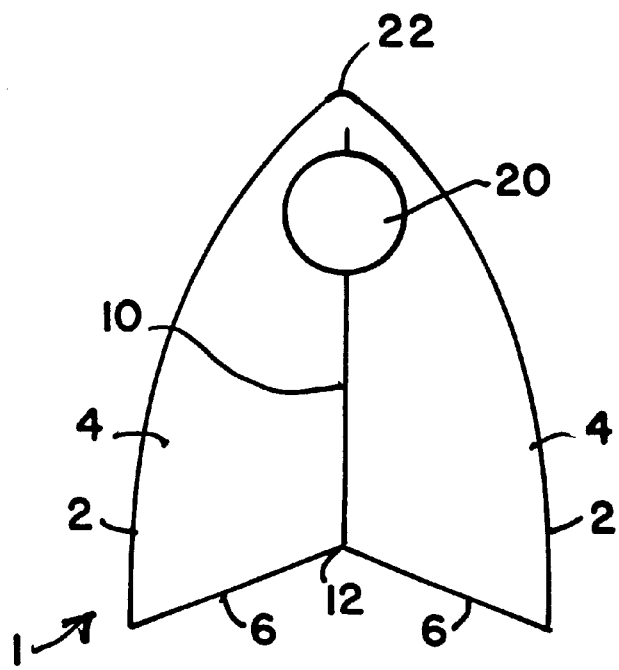
FIG. 5 is a top view of the pitot tube cover of the present invention in the closed position.
Figure 6:
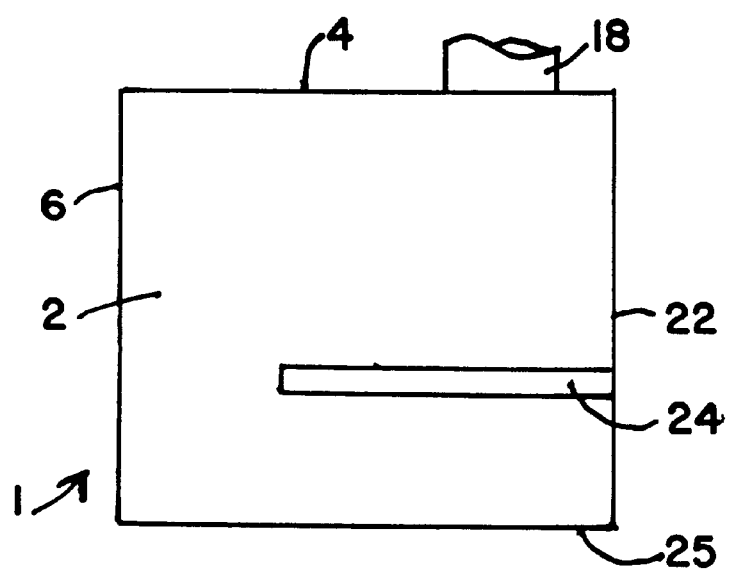
FIG. 6 is a side view of the pitot tube cover of the present invention in the closed position with a pitot tube inside.

The pitot tube cover 1, as depicted in FIG. 2, has is a single piece partitioned vertically by a split 12 down the center into two subdivisions. This partition begins on the front face 6 with a front split 12 and continues on the upper face 4 with an upper edge 10 and a lower edge 14 on the lower face 25. The split extends from the front of the cover until it has passed the cavity 20 for the pitot tube 18. The cavity can be molded or otherwise form for either a specific tube or for a wide variety of tube shapes and sizes. To the rear of the pitot tube 18 is a segment 16 that remains unsplit. This segment 16, along the rear vertical edge 22 of the cover 1 acts as a hinge for the entire device.

Figure 1:
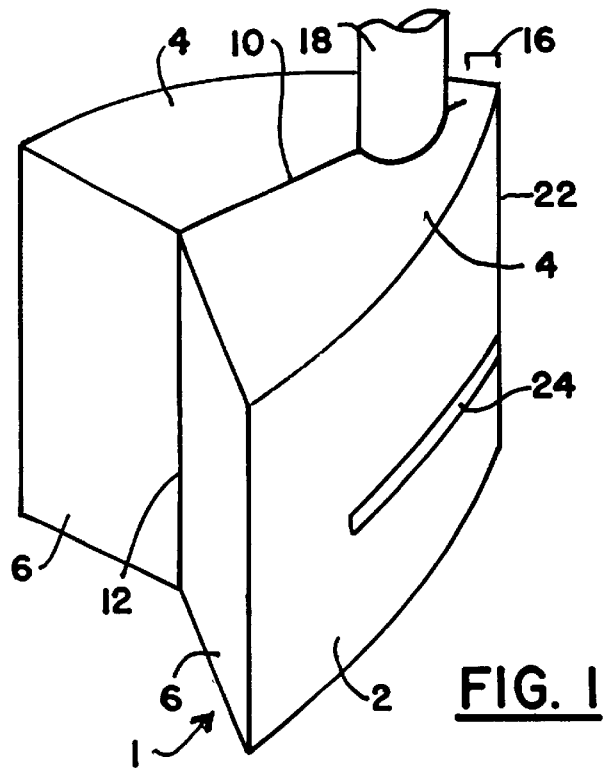
FIG. 1 is a front perspective view of the pitot tube cover of the present invention closed with a pitot tube inside.

The sides of the split cover are held together so that the cover 1 remains on the pitot tube 18 by means of a spring-like tensioning strap 24, as depicted in FIG. 1. This strap is horizontally arranged along the outer side faces 2 of the cover. The apex 26 of the strap 24 is arranged at the rear vertical edge 22. The strap can be held to the cover by preferred indentations (not shown), or by only the spring characteristics that cause the strap to dig into the soft material of the cover. The tension of the strap 24 can be adjusted so that a desired speed can be reached before the cover 1 separates from the pitot tube.

The original position of the cover 1 surrounding the pitot tube 18 an be seen in FIG. 1. Once an aircraft is in flight, the wind is channeled by the front face 6 of the cover towards the slit 12. The face 6 is purposely angled inward to divert the air into the partition.

Once the wind has initially entered the split 12, it continues to force the inner faces 8 of the cover 1 apart. After the cover is sufficiently split apart, the applied wind pressure continues to push the cover off of the pitot tube. This allows the pitot tube 18 to be separated from the molded cavity 20 and into the free air so that it can fall to the ground.

Because the cover is made from polyethylene foam, it is both simple and inexpensive to manufacture. The cover is sufficiently lightweight due to the material used, and therefore causes no damage resulting from its fall.

If desired, the cover can be attached to the aircraft by a connector (not shown) so that it can be reused for multiple flights. The cover can also be painted in bright colors to make it noticeable to the user, Thus, it can also be removed manually and reused like a conventional pitot tube cover.

In another embodiment of the pitot tube cover, the molded cavity 20 is shaped to hold blade-type pitot tubes in addition to the standard round pitot tube 18. The cavity can be molded to accommodate a wide variety of different pitot tube shapes and sizes.

While a number of embodiments of the present invention have been described by way of example, the present invention is not limited thereby. Rather, the present invention should be interpreted to cover any and all variations, permutations, configurations, adaptations, modifications and embodiments that would occur to one skilled in this art having a knowledge of the present invention. Accordingly, the present invention should be limited only by the following claims.

I claim:

1. A cover for a pitot tube having an opening and mounted on a vehicle, said cover comprising:

(a) a body with a center split along a vertical axis of said body and extending from the front to near the rear edge of said body;

(b) a cavity for encompassing said pitot tube;

(c) a tension means for applying frictional engagement holding said cover to said pitot tub within said cavity;

(d) wind surfaces arranged to channel wind into said split thereby separating said cover from said pitot tube and allowing said opening of said pitot tube to be exposed.

2. The cover of claim 1 wherein said cover is made of lightweight plastic material.

3. The cover of claim 1 wherein said tension means is comprised of a spring arranged horizontally with an apex on the rear of said body.

4. The cover of claim 3 wherein said frictional engagement is calibrated using said spring so that said cover splits and separates from said pitot tube at a predetermined speed.

5. The cover of claim 1 wherein said body is of one piece with said split ending behind said molded cavity and in front of said edge to form a rear hinge.

6. The cover of claim 1 wherein said cavity is configured for a predetermined shape of pitot tube.

7. The cover of claim 1 wherein said wind surfaces are in the front of said body.

8. The cover of claim 7 wherein said wind surfaces are angled towards said split of said body.

9. The cover of claim 8 wherein said wind surfaces further force the split of said cover open and force said cover off of said pitot tube.

\* \* \* \* \*